United States Patent [19]
Rousseau et al.

[11] Patent Number: 6,141,547
[45] Date of Patent: Oct. 31, 2000

[54] RADIOTELECOMMUNICATIONS SYSTEM HAVING A MOBILE TERMINAL THAT OPERATES BOTH IN CELLULAR MODE AND IN CORDLESS MODE

[75] Inventors: Emmanuel Rousseau, Paris; Frédéric Vasnier, Colombes, both of France

[73] Assignee: Alcatel, Paris, France

[21] Appl. No.: 09/114,499

[22] Filed: Jul. 13, 1998

[30] Foreign Application Priority Data

Jul. 17, 1997 [FR] France .................. 97 09068

[51] Int. Cl.[7] .................................. H04Q 7/20
[52] U.S. Cl. ............... 455/426; 455/552; 455/462; 455/447; 455/437; 455/417
[58] Field of Search .................. 455/552, 553, 455/462, 463, 464, 426, 454, 447, 466

[56] References Cited

U.S. PATENT DOCUMENTS

| | | | |
|---|---|---|---|
| 5,260,988 | 11/1993 | Schellinger et al. | 455/33.1 |
| 5,673,308 | 9/1997 | Akhavan | 455/33.1 |
| 5,794,141 | 8/1998 | Zicker | 455/418 |
| 5,842,122 | 11/1998 | Schellinger et al. | 455/403 |
| 5,878,344 | 3/1999 | Zicker | 455/426 |
| 5,887,259 | 3/1999 | Zicker et al. | 455/434 |
| 5,920,815 | 7/1999 | Akhavan | 455/426 |

FOREIGN PATENT DOCUMENTS

| | | | |
|---|---|---|---|
| WO9204796 | 3/1992 | WIPO . | |
| WO 95-12957 | 5/1995 | WIPO | H04Q 7/36 |
| WO9711567 | 3/1997 | WIPO . | |

OTHER PUBLICATIONS

G. Mazzioto, "The Subscriber Identity Module for the European Digital Cellular System GSM", Proceedings of the Nordic Seminar on Digital Land Mobile Radio Communications, Oslo, Jun. 26–28, 1990, No. Seminar 4 , Jun. 26, 1990, General Directorate of Posts and Telecommunications; Finland.

*Primary Examiner*—Daniel S. Hunter
*Assistant Examiner*—Yemane Woldetatios
*Attorney, Agent, or Firm*—Sughrue, Mion, Zinn, Macpeak & Seas, PLLC

[57] ABSTRACT

The invention relates to a radiotelecommunications system having a mobile terminal equipped with a subscriber identity module and designed to operate in a cellular network having a plurality of cells. The system has a private base station independent from the cellular network and connected to a wired telecommunications network. The private base station occupies at least a part of one of the cells of the cellular network, to which cell the cellular network has allocated at least one frequency from among all of the frequencies available in the cellular network; if it is situated within a zone close to the private base station, the mobile terminal can operate in cordless mode, in which it communicates with the wired network by communicating by radio with the private base station, radio communication taking place on at least one frequency selected from a predetermined set of one or more frequencies chosen from among all of the frequencies available in the cellular network except at least those frequencies which are allocated to said cell, the set of frequencies being pre-recorded in the subscriber identity module or in a memory zone of the terminal. According to the invention, said set of frequencies is transmitted to the mobile terminal by radio from a base station of the cellular network.

9 Claims, 2 Drawing Sheets

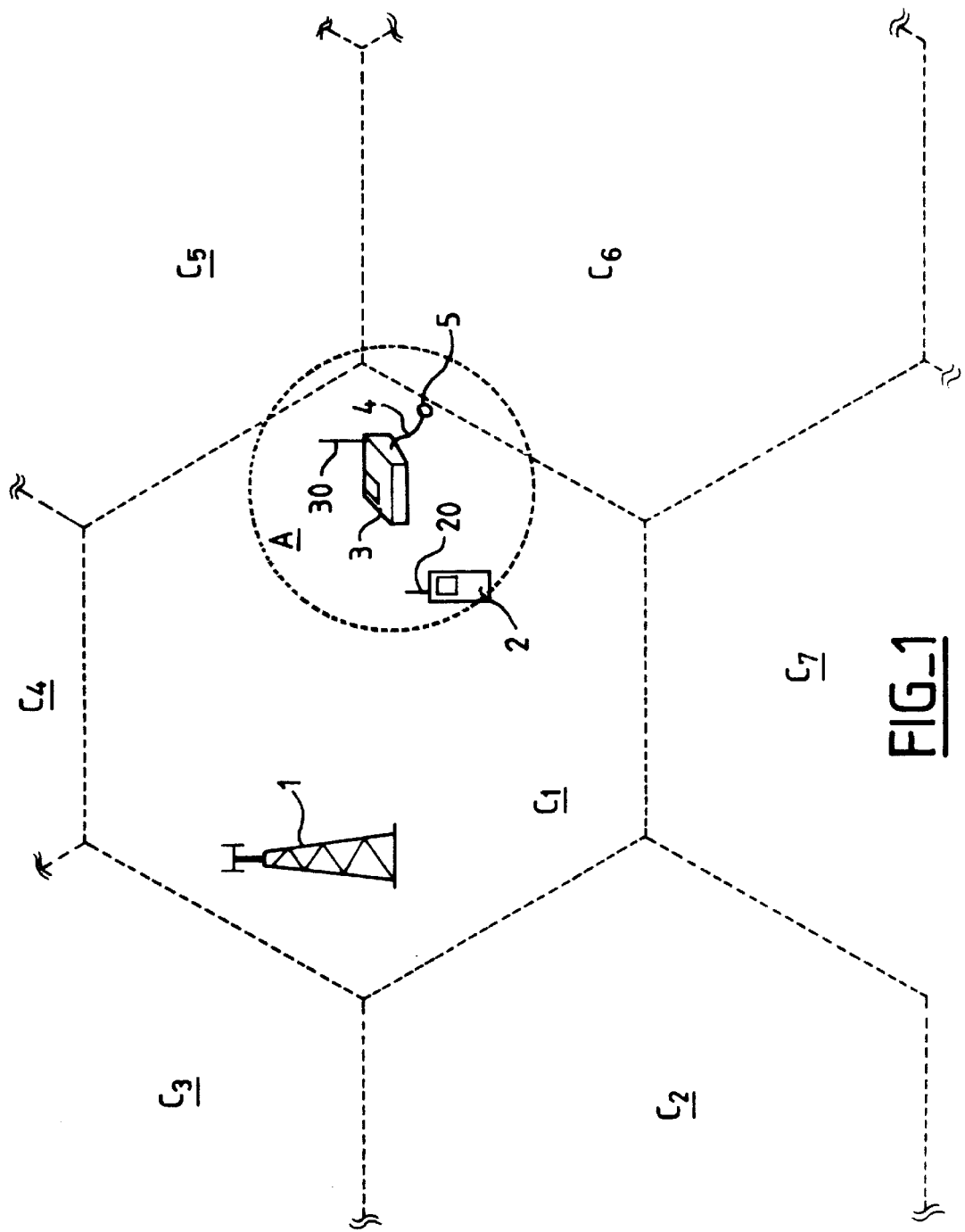
FIG_1

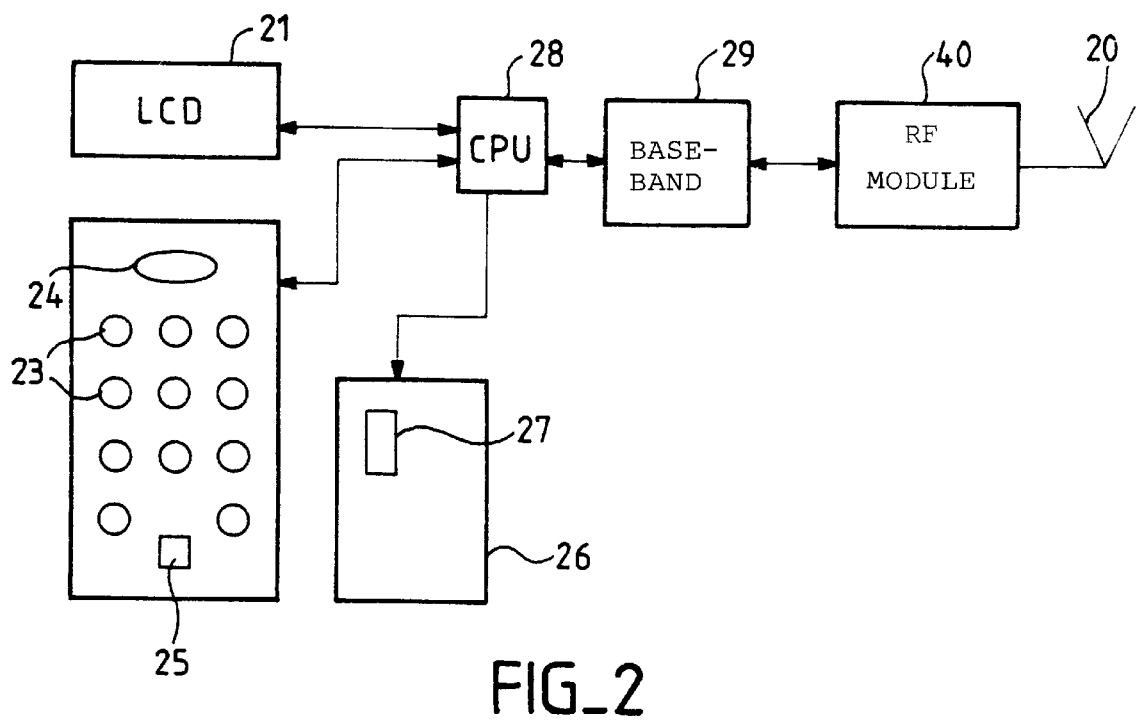
FIG_2
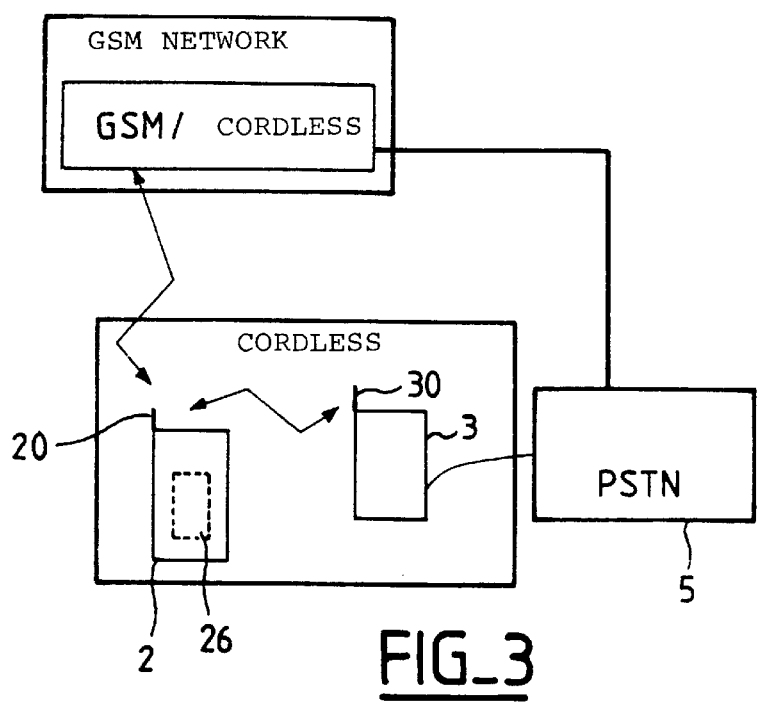
FIG_3

RADIOTELECOMMUNICATIONS SYSTEM HAVING A MOBILE TERMINAL THAT OPERATES BOTH IN CELLULAR MODE AND IN CORDLESS MODE

The present invention relates to a radiotelecommunications system having a mobile terminal provided with a subscriber identity module and designed to operate in a first mode, referred to as "cellular mode" in a cellular network having a plurality of cells.

BACKGROUND OF THE INVENTION

The main purpose of a cellular network, e.g. a digital network using a standardized system such as the Global System for Mobile communications (GSM), the Digital Cellular System (DCS), or the Personal Communication System (PCS) 1900, is to convey a call by radio on a carrier frequency between a base station of the network and a mobile terminal of a user who is a subscriber to the network. Each cellular network is allocated a certain range of frequencies, which range is restricted compared with all of the frequencies that are useable in the system in question. By way of example, GSM has 125 possible carrier frequencies, and, in France, most of them are shared between two main operators, each owning a respective digital cellular network.

Furthermore, the territory covered by any given cellular network is subdivided into cells, each cell generally having a base station suitable for communicating with all of the mobile terminals that are situated in the cell at any given time. A well-known subdivision configuration given by way of example consists in choosing cells that are ideally adjacent, of the same size, and hexagonal in shape. It is thus possible to define a particular set of cells, referred to as a "pattern", e.g. a seven-cell pattern constituted by a central cell surrounded by six adjacent cells.

Moreover, the base stations and the mobile terminals of a cellular network are of limited range, i.e. beyond a certain distance, communication is no longer possible because of the attenuation of the carrier frequency. It is thus possible for the same carrier frequency to be used in different places provided that these places are far enough apart. This is particularly important because, as indicated above, each network possesses only a limited number of carrier frequencies for an ever increasing number of subscribers. Thus, each cellular network defines a scheme for re-using frequencies, and, by way of example, reference may be made to the above-mentioned seven-cell pattern. In such a pattern, different carrier frequencies are allocated to each cell, each cell being allocated one or more carrier frequencies. The pattern is repeated by shifting such that, for any given cell in the initial pattern, there are six closest neighboring cells that reuse the same frequencies, and these cells are uniformly distributed on a circle whose center coincides with the center of the given cell.

The boom in mobile telephones is such that a large and ever-increasing number of private individuals presently possess mobile terminals. Among these users, who are attracted by the concept of being able to communicate with a high degree of freedom, many also have a cordless telephone in their own home or might subsequently procure such a telephone which enables them to be on the phone while being free to move in a zone close to a fixed station in the home, the cordless telephone communicating with said station by radio, the station itself being connected by wire to a wired telecommunications network, e.g. a network of the Public Switched Telephone Network (PSTN) type.

OBJECTS AND SUMMARY OF THE INVENTION

The basic concept of the present invention lies in the fact that it would, undeniably, be advantageous for the user to have a single portable telephone set which could operate not only in "cellular" mode, i.e. via a cellular network to which the user subscribes, but also in "cordless" mode whenever the user is in a predetermined zone, in particular either at home or at work.

An object of the present invention is thus to provide a radiotelecommunications system having a mobile terminal designed to operate both in a "cellular" first mode in a digital cellular network, and in a "cordless" second mode.

There are several problems to be solved to achieve this object:

Firstly, it is necessary to allocate to the mobile terminal one or more frequencies that can be used in the cordless second mode only, so as to enable the mobile terminal to communicate by radio with a private station connected to a wired telecommunications network. These frequencies must be frequencies of the cellular system if it is to be possible to use existing mobile terminals. Furthermore the frequencies must be frequencies of the cellular network to which the user subscribes. If other frequencies are chosen, they are unavoidably frequencies used in another cellular network, generally belonging to another operator, which poses problems.

Therefore, the frequencies that can be used in cordless mode must not interfere with the cell in which the mobile terminal is situated while it is operating in cordless mode. One solution would be to use frequency hopping over the various frequencies used in the cellular network so as to average out the transmitted noise, thereby generating less interference. However, that solution is not adopted by the Applicant because it is effective only if the frequency hopping can be performed over a large number of frequencies, e.g. over all 125 GSM frequencies, and not merely over the limited number of frequencies actually allocated to one cellular network. It is therefore necessary to allocate frequencies that are usable in cordless mode only, as a function of the frequency re-use scheme defined for the cellular network, and as a function of the precise location of the private station.

Such frequency allocation in cordless mode must be transparent for the user. Although it is possible to choose a solution consisting in providing switches on the private station to make it possible to select various frequencies that are usable in cordless mode without interfering with the cellular network, that solution is unattractive to the user.

Such frequency allocation in cordless mode must also be easy to implement, and it must make maximum use of the means that already exist in the cellular network and in the mobile terminal.

Moreover, it is desirable for the frequency allocation for cordless mode to be easy to implement and to be transparent for the user, in particular when the user is already a subscriber to a cellular network and wishes to acquire cordless mode, and it is also desirable for such frequency allocation to be easy to modify, in particular when the user, who owns a mobile terminal that operates in both modes, moves to a different house. If the user moves to a different house, it is necessary to allocate a new set of one or more frequencies, as a function of the frequency re-use scheme of the network and as a function of the new home address.

The problems are solved and the objects are achieved by means of the present invention which provides a radiotelecommunications system having a mobile terminal equipped with a subscriber identity module and designed to operate in a first mode referred to as "cellular mode" in a cellular network having a plurality of cells, the system further having a private base station independent from said cellular network and connected by wire to a wired telecommunications network, said private base station occupying at least a part of one of the cells of the cellular network, to which cell the cellular network has allocated at least one frequency from among all of the frequencies available in the cellular network using a predetermined frequency re-use scheme, the mobile terminal having selection means enabling it to operate in a second mode referred to as "cordless mode" when it is situated within a predetermined zone in the vicinity of the private base station, in which mode the terminal can set up a call to or receive a call from said wired telecommunications network by communicating by radio with said private base station, radio communication taking place on at least one frequency selected from a predetermined set of one or more frequencies also chosen from among all of the frequencies available in the cellular network except at least those, frequencies which are allocated to said cell, said selection means including storage means for storing said predetermined set of one or more frequencies in a storage zone of the two-part unit formed by the terminal and by the subscriber identity module, wherein, when the terminal operates in cellular mode, said predetermined set of one or more frequencies is previously transmitted by radio from the base station of the cellular network that is closest to the mobile terminal, so that said set of frequencies can be stored in said storage means.

Preferably, the storage zone is situated in the subscriber identity module.

Advantageously, said storage means comprise an elementary file of the subscriber identity module.

Furthermore, said predetermined set of one or more frequencies is advantageously transmitted in the form of a point-to-point short service message, preferably of class 2 in order to prevent the user from reading or writing in the storage means.

BRIEF DESCRIPTION OF THE DRAWINGS

Other characteristics and advantages of the present invention appear clearly from the following description given with reference to the accompanying drawings, in which:

FIG. 1 is a diagram showing various portions of a radiotelecommunications system of the present invention;

FIG. 2 is a block diagram showing various portions of a mobile terminal of the present invention; and FIG. 3 is a diagram showing various portions of a radiotelecommunications system for which the set of frequencies that can be used in cordless mode is transmitted by the cellular network.

DETAILED DESCRIPTION OF THE PREFERRED EMBODIMENT

To make the invention easier to understand, like elements are given like references in all three figures.

FIG. 1 shows a portion of a pattern having seven cells $C_1$ to $C_7$ for a cellular network, e.g. a digital network of the GSM type. Each cell $C_1$ to $C_7$ is suitable for communicating by radio with all of the mobile terminals situated in its coverage zone, by using at least one frequency allocated by the network, which frequency is different from the frequencies used in the adjacent cells. More precisely, calls are set up between a base station 1 assigned to each cell and a mobile terminal 2 that subscribes to the cellular network in question.

In the radiotelecommunications system of the present invention, in addition to being able to operate in the mode defined above and referred to as "cellular mode", the mobile terminal 2 can also operate in a second mode, referred to as "cordless mode". For this cordless second mode, the radiotelecommunications system includes a private base station 3 that is independent from the cellular network. The private base station 3 is further connected by wire 4 to a wired telecommunications network, e.g. of the PSTN type, given overall reference 5 in FIG. 1. Typically, the private base station 3 is situated at the home of the user, who subscribes both to the cellular network and also to the wired network, or else it may be at the workplace of the user. It is only possible for the mobile terminal to operate in cordless mode when the terminal is situated in a zone close to and surrounding the private base station 3, which zone is referenced A in FIG. 1 and is defined in the example shown in FIG. 1 by a dashed-line circle. Typically, the zone A may have a diameter of a few tens of meters. During a cordless call, the mobile terminal 2 and the private base station 3 communicate via their respective antennas 20 and 30 by radio on at least one carrier frequency chosen from a predetermined set of one or more frequencies. The call also goes over the wired network 5.

In FIG. 1, the private base station 3 is shown located in the cell $C_1$. As a result, the zone A is also situated, at least in part, in the cell $C_1$. For the above-mentioned reasons, the predetermined set of one or more frequencies must not include the frequencies allocated to the cell $C_1$. Preferably, said set of frequencies does not include the frequencies allocated to the cells $C_2$ to $C_7$ adjacent to the cell $C_1$ either. In this way, the frequencies used in cordless mode can only be frequencies used by cells of the network that are far enough away from the private base station 3 to ensure that there is no interference. This is particularly true since the transmission power required at the portable terminal and at the private base station is very low, and typically of the order of a few hundred milliwatts.

With reference to FIG. 2, a mobile terminal 2 of the present invention mainly comprises, as seen from the outside, a display screen 21, e.g. of the LCD type, a man-machine interface module 22, e.g. conventionally comprising keys 23 for dialing purposes, and cursor/navigation means 24 for enabling the user to scroll through menus and sub-menus corresponding to features offered by the terminal. The terminal of the invention further includes selection means making it possible to choose the operating mode for the terminal, the choice being between cellular mode and cordless mode. In FIG. 2, the selection means are shown constituted by a dedicated key 25 of the man-machine interface. In a variant, the selection means may be accessible via the cursor/navigation means 24, within a particular menu, or else they may be constituted by a switch on the terminal's case.

In addition, the mobile terminal includes read means (not shown) for reading a module 26 for identifying a subscriber of the cellular network, such a module being conventionally referred to as a "subscriber identity module" (SIM) in a GSM. This module 26 conventionally includes means 27 for storing various information that is not itemized herein. To enable the terminal to operate, the above-mentioned elements are connected to a control module 28 comprising, in particular, a microprocessor. Finally, the terminal has a processing module 29 for processing the signals, and a radio-frequency module 40 connected to the antenna 20 of the terminal. These modules are well known to the person skilled in the art, and they are not described in detail herein.

According to an essential characteristic of the invention, the predetermined set of one or more frequencies that can be used in cordless mode is pre-recorded in storage means in a storage zone of the two-part unit formed by the mobile terminal and by the subscriber identity module 26. Preferably, as shown in the figure, the storage zone is situated in the subscriber identity module, e.g. in a file commonly referred to as an "elementary file", and the storage means correspond to the means 27.

Thus, when the user selects cordless mode via the selection means 25 because the user is at home, the control module 28 reads the information contained in the storage means 27 of the subscriber identity module 26, and selects the frequency at which the mobile terminal is to operate. If the predetermined set of frequencies comprises a plurality of frequencies, the mobile terminal may advantageously operate by frequency hopping to reduce interference.

In a variant, the storage zone may be a memory zone in the terminal.

It can happen that, when the user wishes to make an outgoing call, and is within the coverage zone A of the private station, the user forgets to select cordless mode. Calls via a cellular network are known to be more expensive than calls going via a wired network. Thus, when the operator of the cellular network is the same as the operator of the wired network, or when there is a partnership agreement between the operators, a particularly advantageous embodiment of the invention is to provide means for setting up the call via the wired network on a priority basis. Such means may, for example, be located at the terminal which listens constantly to both networks. If, on setting up an outgoing call, the terminal becomes aware that it is within the zone A covered by the private base station, it sends its call via the wired network.

Furthermore, for the purposes of receiving an incoming call, the mobile terminal is associated with two telephone numbers, namely a first number whereby it can receive a call via the cellular network, and a second number whereby it can receive a call via the wired network, subject to being within the coverage zone A of the private base station.

Several solutions may be considered for storing the set of one or more frequencies that can be used in cordless mode only.

Firstly, reference is made to the case when a person buys a mobile terminal for the first time and subscribes to a given cellular network. It is then possible for the operator of the cellular network, who knows the home address of the buyer and the corresponding telephone number associated with the wired network, to deliver to the buyer a subscriber identity module that already contains said set of frequencies in a memory in its storage means.

However, it is not possible to use that solution in the more likely case when the user is already a subscriber to the cellular network, and wishes subsequently to obtain the cordless feature by buying a private base station from the operator. In addition, when the user of a mobile terminal that operates both in cellular mode and in cordless mode moves to a different house, it is necessary for the user to return the subscriber identity module to the operator so that said operator can make the necessary modifications.

To overcome the preceding limitation, and according to another important characteristic, the present invention proposes to cause said set of frequencies to be previously transmitted by radio from a base station of the cellular network so that they can be stored in the storage means. More precisely, when the user buys a private base station, the user gives his or her home address. The operator of the cellular network then determines the set of frequencies that can be used in cordless mode as a function of the frequency re-use scheme and as a function of the home address. Provided that the terminal is switched on in cellular mode, the set of frequencies can be transmitted to it via that base station of the cellular network which is closest to the mobile terminal at the time of transmission. Advantageously, the set of frequencies is transmitted by means of a point-to-point short service message. Preferably, this message is of class 2, so as to prevent the user from reading or writing in the storage means.

If the user moves to a different house, it is necessary merely for the user to give the new address to the operator of the cellular network. The operator then modifies the set of frequencies that can be used in cordless mode, and transmits the modified set of frequencies by radio, as before.

If the operator of the cellular network is identical to or in a partnership agreement with the operator of the wired network, storing said set of frequencies or modifying it in the event that the user moves to a different house may even be completely transparent for the user who merely needs to be assigned a line on the wired network. This situation is shown diagrammatically in FIG. 3 which shows that information interchange is possible between the wired network 5 and the cellular network, and more particularly the elements of the cellular network that serve to send a short message to the mobile terminal 2.

To sum up, the present-invention proposes a radiotelecommunications system in which the same portable telephone set may be used both in a cellular network, and also in a wired network in cordless mode. Furthermore, the system of the invention makes maximum use of the elements that already exist in mobile telephony, and operation of the system can be totally transparent for the user.

Although the description is given with reference to a digital cellular network of the gsm type, it is easy to understand that the invention applies to all types of cellular networks.

What is claimed is:

1. A radiotelecommunications system having a mobile terminal equipped with a subscriber identity module and designed to operate in a first mode referred to as "cellular mode" in a cellular network having a plurality of cells, the radiotelecommunications system comprising:

a private base station independent from said cellular network and connected by wire to a wired telecommunications network, said private base station occupying at least a part of one of the cells of the cellular network, to which cell the cellular network has allocated at least one frequency from among all of the frequencies available in the cellular network using a predetermined frequency re-use scheme;

wherein the mobile terminal comprises:

a selector enabling the mobile terminal to operate in a second mode referred to as "cordless mode" when the mobile terminal is situated within a predetermined zone in the vicinity of the private base station, in which mode the mobile terminal can set up a call to or receive a call from said wired telecommunications network by communicating by radio with said private base station, radio communication taking place on at least one frequency selected from a predetermined set of one or more frequencies also chosen from among all of the frequencies available in the cellular network except at least those frequencies which are allocated to said cell, said selector comprising:

storage means for storing said predetermined set of one or more frequencies in a storage zone of the two-part unit formed by the mobile terminal and by the subscriber identity module, wherein, when the mobile terminal operates in cellular mode, said predetermined set of one or more frequencies is previously transmitted by radio from a base station of the cellular network that is closest to the mobile terminal, so that said predetermined set of one or more frequencies can be stored in said storage means.

2. A radiotelecommunications system according to claim 1, wherein the storage zone is situated in the subscriber identity module.

3. A radiotelecommunications system according to claim 2, wherein said storage means comprise an elementary file of the subscriber identity module.

4. A radiotelecommunications system according to claim 1, wherein said predetermined set of one or more frequencies is transmitted in the form of a point-to-point short service message.

5. A radiotelecommunications system according to claim 4, wherein said point-to-point short service message is of class 2.

6. A radiotelecommunications system according to claim 1, wherein said selector comprises:

a switch accessible to the user of the mobile terminal to enable the user to select the operating mode of the mobile terminal between "cellular mode" and "cordless mode".

7. A radiotelecommunications system according to claim 1, wherein the mobile terminal is associated with two telephone numbers whereby the mobile terminal can receive an incoming call, namely a first telephone number whereby the incoming call comes from the cellular network, and a second telephone number whereby the incoming call comes from the wired telecommunications network.

8. A radiotelecommunications system according to claim 1, wherein, whenever the mobile terminal is setting up an outgoing call via the cellular network while the mobile terminal is situated within said zone in the vicinity of the private base station, the cellular network comprises:

a wired network priority controller for setting up the call via the wired telecommunications network on a priority basis.

9. A radiotelecommunications system according to claim 1, wherein the frequencies allocated to the cells adjacent to said cell are also excluded from said predetermined set of one or more frequencies.

* * * * *